(12) United States Patent
Sudo

(10) Patent No.: US 7,693,140 B2
(45) Date of Patent: Apr. 6, 2010

(54) CDMA TRANSMITTING APPARATUS AND CDMA RECEIVING APPARATUS

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 675 days.

(21) Appl. No.: 10/527,199

(22) PCT Filed: Nov. 14, 2003

(86) PCT No.: PCT/JP03/14493

§ 371 (c)(1),
(2), (4) Date: Mar. 10, 2005

(87) PCT Pub. No.: WO2004/045122

PCT Pub. Date: May 27, 2004

(65) Prior Publication Data

US 2006/0007892 A1    Jan. 12, 2006

(30) Foreign Application Priority Data

Nov. 14, 2002    (JP)    ............................. 2002-330453

(51) Int. Cl.
*H04B 7/216* (2006.01)
(52) U.S. Cl. ...................... 370/355; 455/111
(58) Field of Classification Search ................. 455/111; 370/335
See application file for complete search history.

(56) References Cited

U.S. PATENT DOCUMENTS

| 5,504,775 | A |   | 4/1996  | Chouly et al.  |         |
|-----------|---|---|---------|----------------|---------|
| 5,511,068 | A | * | 4/1996  | Sato           | 370/335 |
| 5,544,167 | A | * | 8/1996  | Lucas et al.   | 370/342 |
| 5,809,020 | A | * | 9/1998  | Bruckert et al.| 370/335 |
| 6,069,884 | A | * | 5/2000  | Hayashi et al. | 370/335 |
| 6,173,005 | B1| * | 1/2001  | Kotzin et al.  | 375/141 |
| 6,317,410 | B1|   | 11/2001 | Allpress et al.|         |
| 6,333,934 | B1| * | 12/2001 | Miura          | 370/441 |
| 6,507,574 | B1|   | 1/2003  | Kitade         |         |

(Continued)

FOREIGN PATENT DOCUMENTS

CN    1179652    4/1998

(Continued)

OTHER PUBLICATIONS

Supplementary European Search Report Dated Feb. 12, 2008.

(Continued)

*Primary Examiner*—Lester Kincaid
*Assistant Examiner*—Diego Herrera
(74) *Attorney, Agent, or Firm*—Dickinson Wright, PLLC

(57) ABSTRACT

An S/P converting section (101) converts input transmission signals A1, A2, B1, B2, . . . , K1, K2 to parallelized data, separated in individual transmission lines. Spreading sections (102, 103) spread the respective data under control of a spread control section (107). Adding sections (104-1, 104-2) multiplex spread data. Transmitting sections (105-1, 105-2) provide radio transmission processing to the multiplexed signals, and transmit the data via antennas (106-1, 106-2) by radio. The spread control section (107) controls the spreading methods in the spreading sections (102, 103) based on channel quality. This makes it possible to improve error rate characteristics of the received signal and as maintain spectrum efficiency when varying data is transmitted from multiple antennas.

21 Claims, 4 Drawing Sheets

U.S. PATENT DOCUMENTS

| | | | |
|---|---|---|---|
| 6,717,929 B1* | 4/2004 | Ooba | 370/335 |
| 6,741,587 B2* | 5/2004 | Holma et al. | 370/362 |
| 6,983,008 B2* | 1/2006 | Mesecher | 375/130 |
| 2001/0040913 A1 | 11/2001 | Arai | |
| 2001/0053143 A1 | 12/2001 | Li et al. | |
| 2002/0160721 A1 | 10/2002 | Kanemoto | |
| 2003/0016640 A1* | 1/2003 | Onggosanusi et al. | 370/335 |
| 2003/0076790 A1* | 4/2003 | Hiramatsu et al. | 370/318 |
| 2003/0198282 A1* | 10/2003 | Tujkovic et al. | 375/146 |
| 2004/0047402 A1 | 3/2004 | Hui et al. | |
| 2007/0116091 A1* | 5/2007 | Kakura | 375/130 |

FOREIGN PATENT DOCUMENTS

| | | |
|---|---|---|
| CN | 1248109 | 3/2000 |
| CN | 1365551 | 8/2002 |
| EP | 0755127 | 1/1997 |
| EP | 0836288 | 4/1998 |
| EP | 0881781 | 12/1998 |
| EP | 1193886 | 4/2002 |
| JP | 2001119328 | 4/2001 |
| JP | 2001268050 | 9/2001 |
| JP | 2002044051 | 2/2002 |
| JP | 2001135328 | 4/2004 |

OTHER PUBLICATIONS

Chinese Office Action dated May 9, 2008 with English Translation.
PCT International Search Report dated Jan. 20, 2004.
W-CDMA Technology Information Communication System Technology Course, Fujitsu International Engineering Co., Ltd., Aug. 2002, the 4th edition, pp. 2-33, 2-34, 2-48, FTS-M2113-J-04, Ver. 4. with partial English translation.

* cited by examiner

CDMA TRANSMITTING APPARATUS AND CDMA RECEIVING APPARATUS

TECHNICAL FIELD

The present invention relates to a transmitting apparatus and a receiving apparatus that perform parallel communication of varying data between multiple transmission and reception antennas, as in MIMO (Multi-Input/Multi-Output) communications.

BACKGROUND ART

In recent years, attention has been paid to MIMO (Multi-Input/Multi-Output) communications as a technique that enables communications for large-capacity data such as image.

In MIMO communications, varying transmission data (sub-streams) is transmitted from multiple antennas at the transmitting side, and the receiving side separates the multiple transmission data mixed through the propagation path back to the original transmission data using propagation path estimation values (for example, see Unexamined Japanese Patent Publication No. 2002-44051 (FIG. 4)).

Actually, in MIMO communications, signals sent from transmitting apparatuses are received by the same or a greater number of antennas than the transmitting apparatuses, and propagation path characteristics between the antennas are estimated based on a pilot signal inserted in each signal received by the antennas. For example, when there are two transmitting antennas and two receiving antennas, the estimated propagation path characteristic, H, can be expressed in a matrix of 2 rows×2 columns. In MIMO communications, a transmission signal transmitted from each transmitting antenna is obtained based on the four components of the obtained propagation path characteristic H and a received signal obtained by each receiving antenna.

In this way, in MIMO communications, since the receiving side can separate the signals sent from the multiple transmitting antennas with the same timing and the same frequency into individual sub-streams, the amount of data proportional to the number of transmission antennas can be transmitted, thereby enabling high-speed and large-capacity communications.

In addition, in MIMO communications, since multiple data can be surely transmitted in parallel, transmission data per time is increased correspondingly. However, it is only when all the inter-antenna propagation paths have good characteristics that an increase in the amount of transmission data corresponding to the number of antennas can be expected, and, in actuality, there are few cases in which the propagation path characteristics are all good, and there are propagation paths with poor propagation path characteristics. In such case, at time of compensating other channel interference, an interference compensation error occurs in data transmitted through the propagation path due to noise and the like, and error rate characteristics upon demodulation of the received data decrease. At this time, if retransmission control is performed, the received data is determined as an error, and retransmission of data is repeated and the amount of overall transmission data practically decreases.

DISCLOSURE OF INVENTION

An object of the present invention is to provide a CDMA transmitting apparatus and a CDMA receiving apparatus that, when varying data is transmitted from multiple antennas, maintain the spectrum efficiency and improve the error rate characteristics of the received data.

The propagation path environment where carrier waves transmitted from the multiple antennas of the MIMO transmitting apparatus pass is not equal, and there are propagation paths with poor propagation path characteristics. In such case, at time of compensating other channel interference, an interference compensation error occurs in data transmitted through the propagation path due to noise and the like, and error rate characteristics upon demodulation of the received data decrease. However, in order to improve the error rate characteristic, if transmission power is increased, if a spreading factor is increased, or if the number of code division multiplexes is decreased in the case of using a CDMA system, the spectrum efficiency also decrease, leading to an unfavorable result that a channel capacity is reduced in view of the entire system.

The present inventor paid attention to this point and came to achieve the present invention by discovering that by providing a spreading section for each transmission line when the CDMA system is used in an MIMO communication apparatus, a spreading method can be independently changed for each transmission line.

Namely, the outline of the present invention is that a different spreading method is independently set in each transmission line when varying data is respectively transmitted in parallel from each of multiple antennas (transmission lines) as in MIMO communications. This setting may be performed with consideration given to the channel quality of the receiving side and the like.

Accordingly, for example, when the above spreading method changes the spreading factor in spreading for each transmission line, the spreading factor used in a transmission line with poor channel quality (transmission path environment) is increased, thereby making it possible to improve the channel quality. Moreover, important data is transmitted through a transmission line with a high spreading factor, thereby making it possible to improve error rate characteristics of important data.

For example, there are three ways of changing the spreading method, as in the following:

The first way is to change the spreading factor for each transmission line; the second way is to change the number of spreading codes for use (the number of multiplex) for each transmission line; and the third way is to change the number of spreading codes to be assigned to one user (the number of assigning spreading codes) for each transmission line.

BEST MODE FOR CARRYING OUT THE INVENTION

The following specifically explains embodiments of the present invention with reference to the accompanying drawings. In addition, Embodiment 1 shows a case in which the spreading factor is changed for each transmission line, and Embodiment 2 shows a case in which the number of multiplexes is changed for each transmission line or a case in which the number of assigning spreading codes is changed for each transmission line. Though explanation is given here by taking as an example a case in which the CDMA transmitting apparatus and the CDMA receiving apparatus according to the present invention each have two antennas, the present invention can be applied to cases where the number of antennas is arbitrarily set.

Embodiment 1

Figure 1:
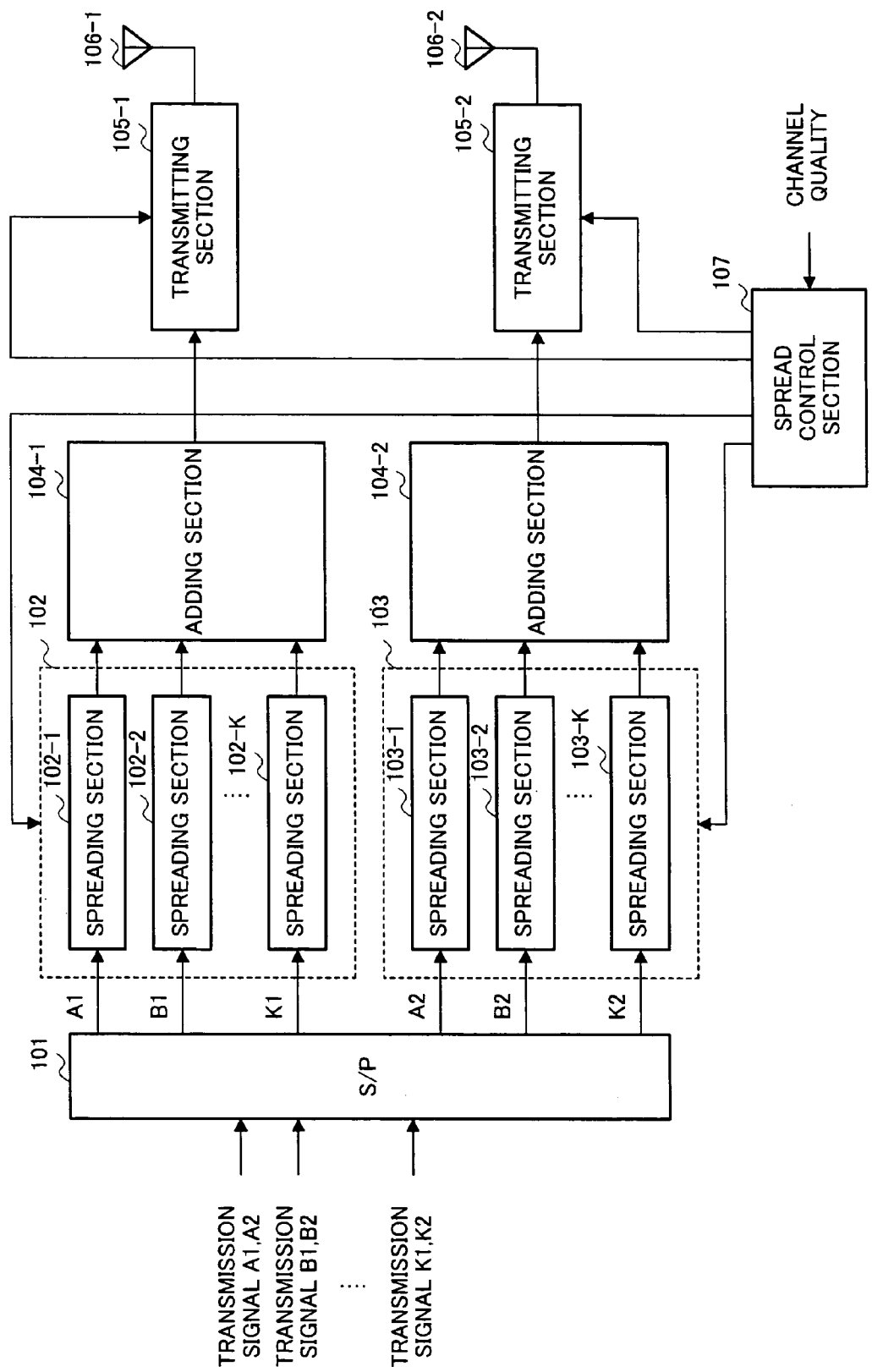
FIG. 1 is a block diagram illustrating a configuration of a CDMA transmitting apparatus according to Embodiment 1 of the present invention.

FIG. 1 is a block diagram illustrating a configuration of a CDMA transmitting apparatus according to Embodiment 1 of the present invention.

The CDMA transmitting apparatus illustrated in FIG. 1 has an S/P converting section 101, spreading sections 102, 103, an adding section 104, a transmitting section 105, an antenna 106, and a spread control section 107. Among these, the spreading section 102 to the antenna 106-1 will be referred to as a first transmission line, and the spreading section 103 to the antenna 106-2 will be referred to as a second transmission line.

In FIG. 1, transmission signals A1, A2, B1, B2, . . . , K1, K2, each having multiple sub-streams, are input to the S/P converting section 101. Here, among these transmission signals, A1, B1, . . . , K1 represent the data for the first transmission line and A2, B2, K2 represent the data for the second transmission line. Moreover, the transmission signals have K types of sub-streams. For example, sub-streams A1 and A2 indicate speech information, sub-streams B1 and B2 indicate image information and sub-streams K1 and K2 indicate control information, thus varying media information is used.

The S/P converting section 101 converts the input transmission signals A1, A2, B1, B2, . . . , K1, and K2 to parallelized data separated for each transmission line, and outputs the results to the corresponding spreading sections 102-1 to 102-K and the spreading sections 103-1 to 103-K, respectively. For example, the transmission signals A1 and A2 are converted to parallelized data through the S/P converting section 101, and A1 and A2 are output to the spreading section 102-1 and the spreading section 103-1, respectively.

In the spreading section 102, the spreading sections 102-1 to 102-K, which correspond to the respective data of the parallelized data output from the S/P converting section 101, spread the respective data under control of the spread control section 107, and output the results to the adding section 104-1. Similarly, in the spreading section 103, the spreading sections 103-1 to 103-K, which correspond to the respective data of the parallelized data output from the S/P converting section 101, spread the respective data under control of the spread control section 107, and output the results to the adding section 104-2.

The adding sections 104-1 and 104-2 add (multiplex) the parallelized data, which is respectively output from the spreading sections 102 and 103, and outputs the results to the transmitting sections 105-1 and 105-2.

The transmitting sections 105-1 and 105-2 provide predetermined radio transmission processings including up-conversion to the multiplexed signals output from the adding sections 104-1 and 104-2, and transmit this data by radio via the antennas 106-1 and 106-2. Moreover, when a control signal relating to transmission power is sent from the spread control section 107, power of the transmission signal in each transmission line is changed according to the control signal.

The spread control section 107 controls the spreading method in the spreading sections 102 and 103 based on the channel qualities. Additionally, in this embodiment, it is considered that the spreading factor is changed as the spreading method. For example, in connection with the transmission line with a poor channel quality, the receiving side selects such a spreading method that improves the error rate characteristics (reception accuracy) Namely, in this embodiment, the spreading factor of spreading in connection with the transmission line with a poor channel quality is increased. Here, the channel quality may be sent from the receiving side, and in the case where transmission power control is performed by the transmitting side, transmission power may be used instead of this.

Figure 2:
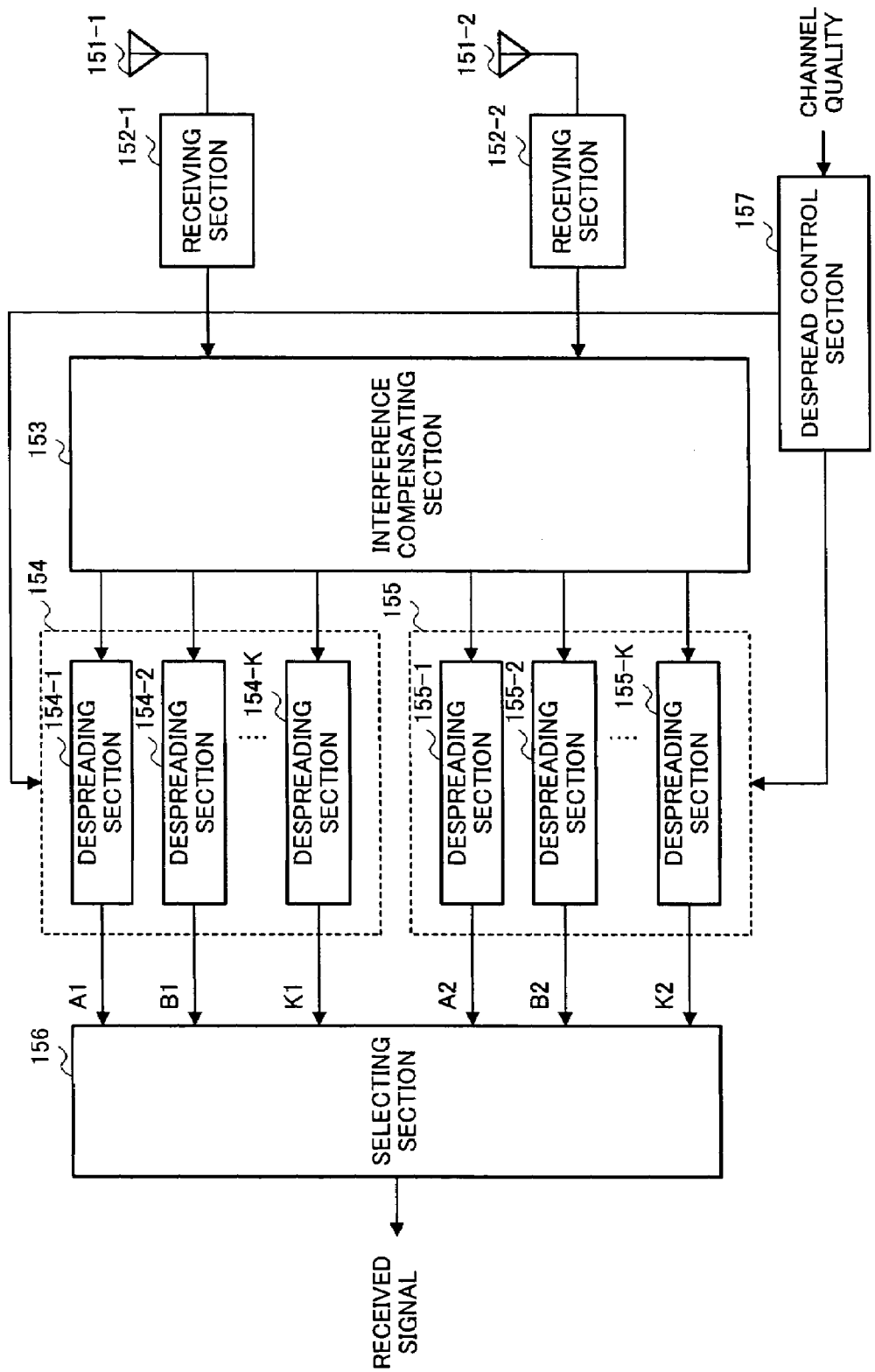
FIG. 2 is a block diagram illustrating a configuration of a CDMA receiving apparatus according to Embodiment 1 of the present invention.

FIG. 2 is a block diagram illustrating a configuration of the CDMA receiving apparatus that receives signals transmitted by radio from the antennas 106-1 and 106-2 of the CDMA transmitting apparatus. The CDMA receiving apparatus has an antenna 151, a receiving section 152, an interference compensating section 153, a despreading sections 154, 155, a selecting section 156, and a despread control section 157.

In FIG. 2, the receiving sections 152-1 and 152-2 provide predetermined radio reception processings including down-conversion to the signals received by two antennas 151-1 and 151-2, and output the results to the interference compensating section 153.

The interference compensating section 153 first estimates (channel estimation) propagation path characteristics between the antennas 106-1, 106-2 and the antennas 151-1, 151-2, using the pilot signals included in the signals received by the respective antennas. Namely, according to this embodiment, since both the transmitting side and the receiving side use two antennas, 4 (2×2) propagation path characteristics are estimated. Next, the interference compensating section 153 separates the signals output from the receiving sections 152-1 and 152-2 back to the original sub-streams sent from two antennas 106-1 and 106-2 of the transmitting side based on the estimated propagation path characteristics information. In other words, since the received signal is a mixture in which the data sent from two antennas 106-1 and 106-2 of the transmitting side is mixed, the received signal is multiplied by the inverse matrix of the matrix including propagation path characteristics information of 2 rows×2 columns using the propagation path characteristics obtained by the channel estimation, thereby separating the two data mixed with each other back to the two sub-streams sent from the transmitting side. Additionally, not only the method using the aforementioned inverse matrix operation but also a method using an equalizer sequence determination, an MLSE (Maximum Likelihood Sequence Estimation) and the like can be used as a sub-stream separation method.

The despreading sections 154 and 155 obtain the transmission data before spreading by multiplying the signal output from the interference compensating section 153 by a spread code based on the spreading factor sent from the despread control section 157, and output the result to the selecting section 156.

The selecting section 156 selects a signal sent to the own apparatus from the received signals output from the despreading sections 154 and 155, and output the result The output signal is subjected to a predetermined processing via a decoding section, an error correcting section and the like (not shown), so that the desired received signal is obtained. Additionally, in the case where both received signals output from the despreading sections 154 and 155 are signals that are sent to the own apparatus, the selecting section 156 outputs the signals by way of time division.

Though the CDMA receiving apparatus according to this embodiment basically requires two receiving lines, the following processing can be performed by one line because of the selecting section 156.

The despread control section 157 obtains the spreading factors used in the spreading sections 102 and 103 by using the same algorithm as that of the spread control section 107 of the transmitting side, and reports the despreading sections 154 and 155 of the result.

In the aforementioned configuration, the spreading factor used in the spreading section 102 and the spreading factor used in the spreading section 103 are set independently of each other. For example, in the case where the spreading factors used in the spreading sections 102-1 to 102-K in the spreading section 102 and the spreading factors used in the spreading sections 103-1 to 103-K in the spreading section 103 are singly set respectively, and their values are SF1 and SF2, SF1 and SF2 can be set independently of each other without considering the other value.

This makes it possible to improve the error rate characteristic on the receiving side of the signal transmitted from the first transmission line as compared with the signal transmitted from the second transmission line when, for example, SF1 is set greater than SF2. At this time, important data is sent from the first transmission line, thereby making it possible to improve the error rate characteristics of important data.

Additionally, in the aforementioned configuration, SF1 may be set to be greater than SF2, in burst, for a fixed period of time. For example, when the number of transmitting parties having a poor channel quality is small, it is not efficient to keep SF1 set greater than SF2 since transmission efficiency of one transmission line is always sacrificed. However, it is possible to improve both the transmission efficiency and the error rate characteristics of the receiving side when the aforementioned setting is performed for only a fixed period to improve the error rate characteristics of the receiving side of the transmitting party with the poor channel quality for this period and the conventional communication method is adopted for the other period.

Moreover, though the explanation is given here by taking as an example a case where a single spreading factor is used in the spreading sections 102-1 to 102-K in the spreading section 102 and a single spreading factor is used in the spreading sections 103-1 to 103-K in the spreading section 103, respectively, in order to simplify the explanation, the spreading factors need not always be uniform. For example, in the case where several kinds of spreading factors are used in the spreading sections 103-1 to 103-K (for instance, when the spreading factor used in the spreading section 102-1 is different from the spreading factor used in the spreading section 102-2, it is desirable that one should be an integral multiple of the other), SF1 may be set to a value greater than an average value of the spreading factors of several kinds, or such a manner that a value greater than all of the spreading factors used in the spreading sections 103-1 to 103-K may be used. Also, in case the spreading factors used in the spreading sections 102-1 to 102-K in the spreading section 102 and the spreading factors used in the spreading sections 103-1 to 103-K in the spreading section 103 are not uniform, the average values of the respective transmission lines may be obtained and scale comparison may be performed between SF1 and SF2. In such case, in order to set SF1 to be greater than SF2, all the spreading factors of the spreading sections 102-1 to 102-K in the spreading section 102 may be uniformly increased, or a specific spreading section, for example, the spreading factor of only the spreading section 102-1 may be increased. The latter is particularly effective when only the spreading section 102-1 takes charge of signals for a certain user and the channel quality of this user is poor.

Moreover, in the aforementioned configuration, the spread control section 107 controls spreading factors SF1 and SF2 of the spreading sections 102 and 103 according to the channel qualities. This makes it possible to highly set the spreading factor of the transmission line with a poor channel quality.

Additionally, though the explanation is given here by taking as an example a case where the spreading method in the spreading sections 102 and 103 is controlled according to the channel qualities, the aforementioned control may be performed according to the degree of importance of the original transmission data. For example, since control information of the communication system and retransmission information and the like can be considered as important data, such data can be set to be transmitted from the transmission line in which the spreading factor is set high.

Moreover, transmission power may be used in place of the channel quality. This is because transmission power must be increased according to the quality when the channel quality is poor at the time of performing transmission power control.

Moreover, the number of data retransmissions may be used in place of the channel quality. This is because the number of data retransmissions must be increased when the channel quality is poor in the communication system that performs retransmission control such as ARQ Automatic Repeat request.

Moreover, in the above configuration, in the case where the spread control section 107 sets the spreading factor SF1 of the spreading section 102 to be greater than the spreading factor SF2 of the spreading section 103, the spread control section 102 outputs a control signal for increasing transmission power to the transmitting section 105-1 at the same time. Accordingly, since the spreading factor is set high to increase transmission power of the signal in which the error rate characteristic of the receiving side is improved, a combination of the both effects of increased spreading factors and increased transmission power are superimposed, so that the error rate characteristic of the receiving side can be improved.

Additionally, in the above configuration, when SF1 is set to be greater than SF2, the S/P converting section 101 may assign the transmitting party where the number of retransmissions is increased (the number of retransmissions is greater than a predetermined number of times) to the transmission line of the spreading sections 102-1 to 102-K. Accordingly, since the channel where the error rate characteristic of the receiving side is improved is assigned to the transmitting party where the number of retransmissions is large, data retransmission can be prevented from being repeated and data retransmission can be speedily completed.

According to this embodiment, when varying data is transmitted from the multiple antennas, spreading can be performed by spreading factors that vary on a per transmission line, so that it is possible to improve the error rate characteristics of the received signal at the receiving apparatus and maintain the spectrum efficiency.

Embodiment 2

Figure 3:
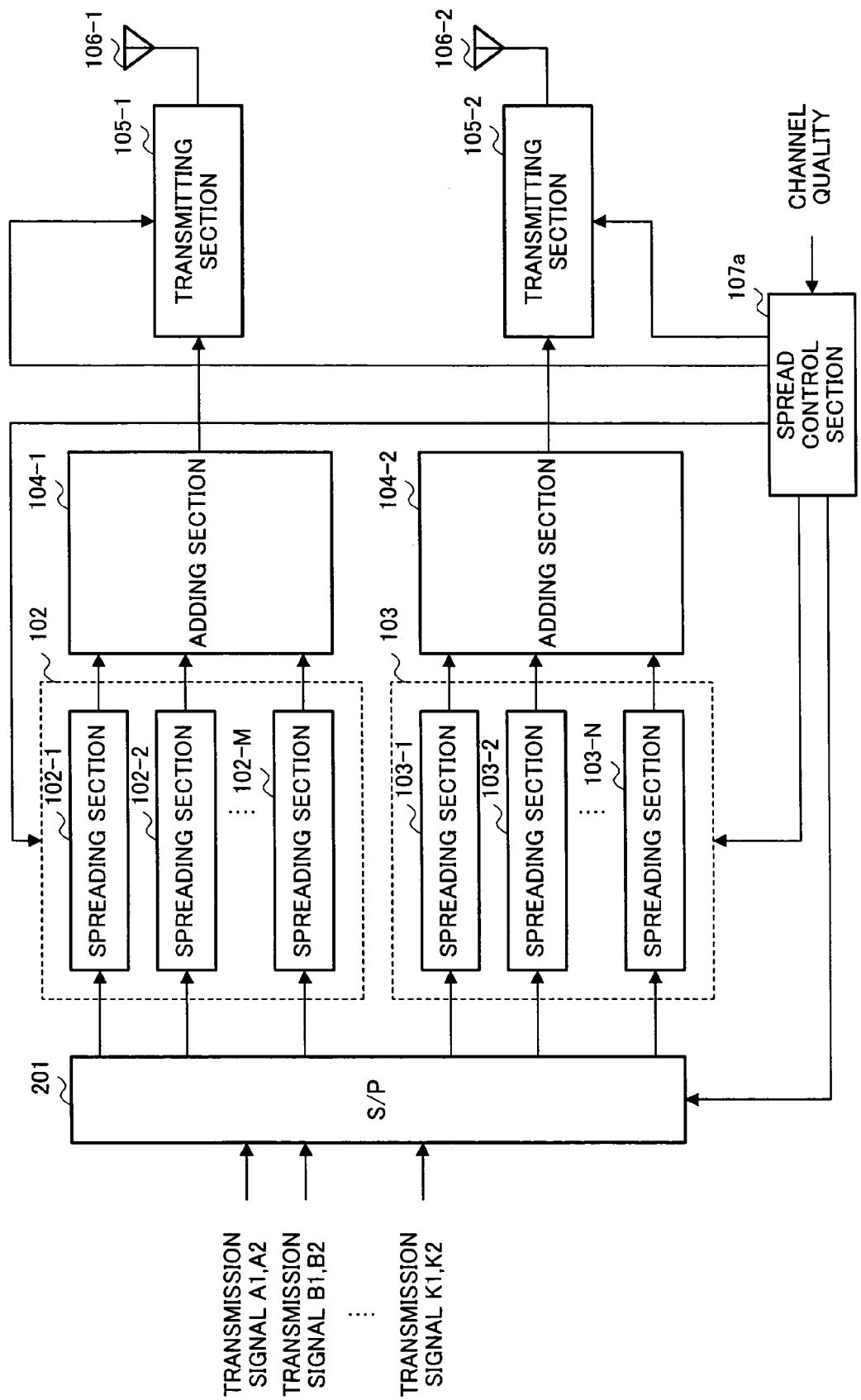
FIG. 3 is a block diagram illustrating a configuration of a CDMA transmitting apparatus according to Embodiment 2 of the present invention.

FIG. 3 is a block diagram illustrating a configuration of a CDMA transmitting apparatus according to Embodiment 2 of the present invention. This CDMA transmitting apparatus has the same basic configuration as that of the CDMA transmitting apparatus shown in FIG. 1, and the same reference characters as those of FIG. 1 are added to the same configuration components as those of FIG. 1, and the explanation is omitted.

A feature of this embodiment is that, among spreading methods for each transmission line, the number of code multiplexes changes based on the channel qualities.

In FIG. 3, a spread control section 107a decides the number of code multiplexes in the spreading sections 102 and 103 based on the notified channel qualities, and outputs a control signal to the spreading sections 102 and 103 so that the spreading sections 102 and 103 perform spread processing using the decided number of code multiplexes. Moreover, a control signal is also output to an S/P converting section 201 to control the S/P converting section 201 so that a signal is output to only the spreading section actually used in the spreading sections 102 and 103 from the S/P converting section 201.

The S/P converting section 201 separates inputting transmission signals A1, A2 to parallelized data for the first transmission line and the second transmission line based on the control signal from the spread control section 107a and at the same time converts the transmission signals to output the signal to only the spreading section actually used in the spreading sections 102 and 103. For example, when the number of code multiplexes in the spreading section 102 is M and the number of code multiplexes in the spreading section 103 is N, K kinds of sub-streams are converted to M and N sub-streams in the S/P converting section 201.

The spreading sections 102 and 103 spread M and N sub-streams output from the S/P converting section 201 and output the results to the adding sections 104-1 and 104-2, respectively. Additionally, though FIG. 3 illustrates only M spreading sections in the spreading section 102 and only N spreading sections in the spreading section 103 in order to simplify the explanation, this illustrates only the block that is actually used, and K (K>M, K>N) spreading sections are actually included, similar to Embodiment 1.

In the aforementioned configuration, the number of code multiplexes M actually used in the spreading section 102 and the number of code multiplexes N actually used in the spreading section 103 are set independently of each other. Accordingly, for example, when M is set to be smaller than N, the error rate characteristic of the receiving side of the signal transmitted from the first transmission line can be improved as compared with the signal transmitted from the second transmission line. At this time, important data is transmitted from the first transmission line, thereby making it possible to improve the error rate characteristic of important data.

Moreover, in the aforementioned configuration, the spread control section 107a controls the number of code multiplexes M and N of the spreading sections 102 and 103 according to the channel qualities. This makes it possible to set the number of code multiplexes of the transmission line with a poor channel quality to be small.

Figure 4:
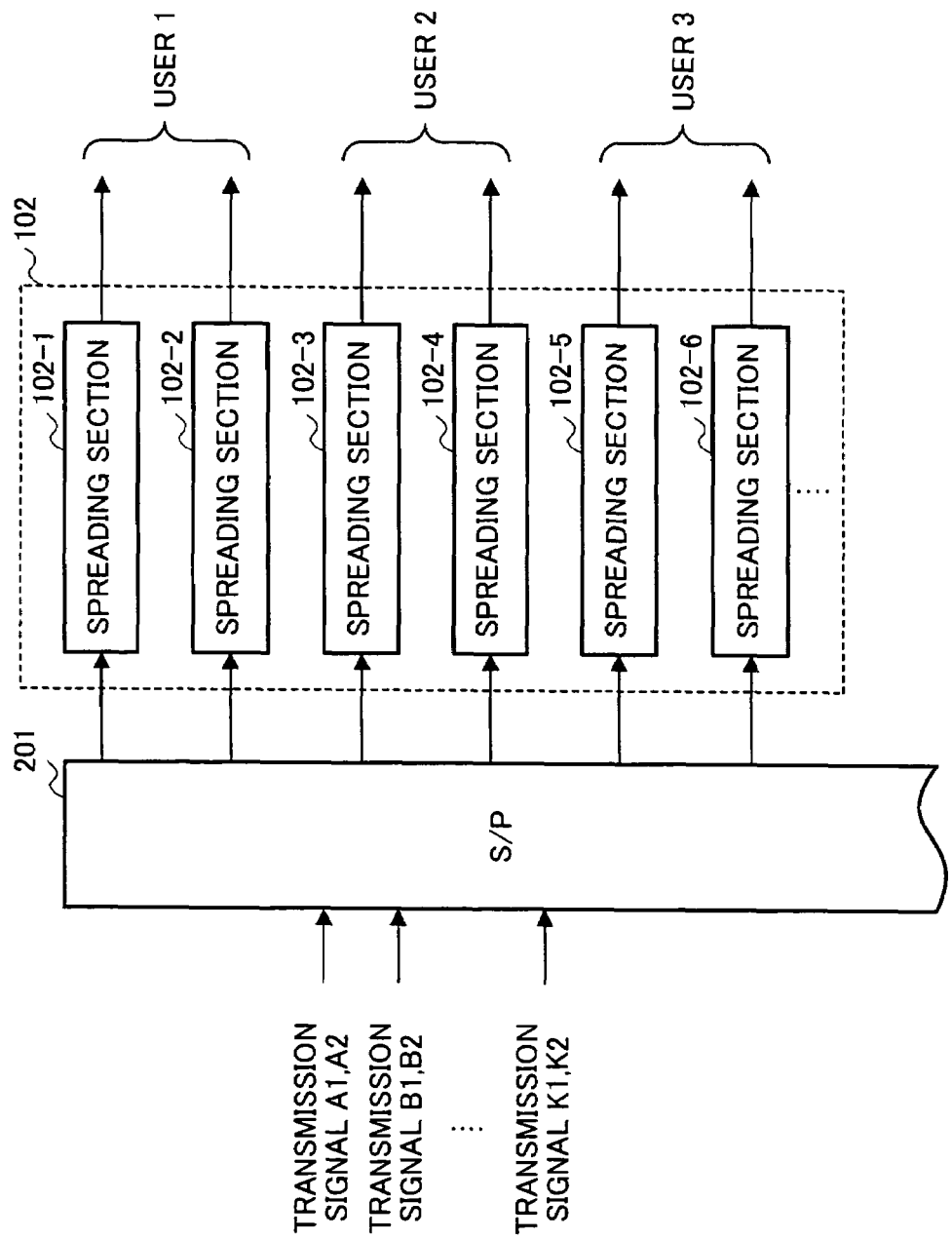
FIG. 4 is a view in which only a portion around a spreading section of the CDMA transmitting apparatus according to Embodiment 2 of the present invention is extracted.

Moreover, by the same configuration, the number of spreading codes to be assigned for each user can be changed for each transmission line in the spreading method. FIG. 4 is a view in which only a portion around the spreading section 102 is extracted from FIG. 3. As illustrated in this figure, in the case of adopting a multicode system that assigns multiple spreading codes to one user such as case in which the spreading sections 102-1 and 102-2 are assigned to user 1 and the spreading sections 102-3 and 102-4 are assigned to user 2, the number of assigning spreading varies between the transmission lines.

Accordingly, a large number of assigning spreading codes is assigned to the users (transmitting parties) having a poor channel quality, thereby making it possible to improve the error rate characteristics of these users received signals.

Additionally, the number of code multiplexes of the transmission line with a poor channel quality or the number of spreading codes to be assigned to the transmitting party with a poor channel quality may be set, in burst, for only a fixed period of time. For example, when the number of transmitting parties having a poor channel quality is low, it is not so efficient to perform the aforementioned setting at all times since transmission efficiency of one transmission line is always sacrificed. However, it is possible to improve both the transmission efficiency and the error rate characteristics of the receiving side when the aforementioned setting is performed for only a fixed period to improve the error rate characteristic of the receiving side of the transmitting party with the poor channel quality for this period and the conventional communication method is adopted for the other period.

The CDMA receiving apparatus that receives the signal sent from the CDMA transmitting apparatus adopts the same configuration as that of Embodiment 1, and the explanation is omitted.

In this way, according to this embedment, since it is possible to use the number of multiplexes or the number of assigning spreading codes different for each transmission line when varying data is transmitted from the multiple transmission lines, respectively, the error rate characteristic of the received signal can be improved by the receiving apparatus as maintaining the spectrum efficiency.

The CDMA transmitting apparatus and CDMA receiving apparatus according to the present invention can be installed in a communication terminal apparatus and a base station apparatus in a mobile communication system, thereby making it possible to provide a communication terminal apparatus and base station apparatus having the same functions and effects as described above.

Although a case has been described herein where the spread control section of the present invention is installed in the CDMA transmitting apparatus and the transmitting side sets the spreading method, it is equally possible to use such a manner that the spread control section is installed in the CDMA receiving apparatus and the receiving side sets the spreading method and provides instructions on the spreading method to the transmitting side.

Moreover, turbo code may be used as an error correction code in the CDMA transmitting apparatus and CDMA receiving apparatus according to the present invention. In such case, when turbo decoding is performed using a systematic bit and a parity bit, the transmission line where the high spreading factor is set or the transmission line where the small number of code multiplexes is set is assigned to the systematic bit that has a large influence on the error rate characteristic of turbo-decoded data. Accordingly, since the reception quality of the systematic bit can be improved, the error rate characteristics of turbo-decoded data can be improved.

Furthermore, the CDMA transmitting apparatus and CDMA receiving apparatus according to the present invention can be used in the transmitting apparatus and receiving apparatus using a multi-carrier system such as OFDM (Orthogonal Frequency Division Multiplex) and the like, thereby making it possible to provide a multi-carrier transmitting apparatus and multi-carrier receiving apparatus having the same function and effect as mentioned above. The transmission line using multi-carrier system has an effect that reduces inter-symbol interference due to multipath under a multipath environment since a low symbol rate (long symbol length) is set. Moreover, the inter-symbol interference due to multipath can be removed by inserting a guard interval.

Furthermore, although a case has been described herein where the components that configure the present invention are included in one CDMA transmitting apparatus, the present invention is also applicable to a case in which the spreading section 102 to the antenna 106-1, the spreading section 103 to the antenna 106-2, and the spread control section 107 are provided in different apparatuses, respectively, to configure one communication system as a whole.

Moreover, although the explanations herein assume MIMO communications, the present invention is by no means limited to MIMO communications and is applicable to a case in which varying data is transmitted in parallel from multiple antennas (transmission lines).

As explained above, according to the present invention, in the case where data is transmitted from the multiple antennas, respectively, the error rate characteristic of received data can be improved.

This application is based on Japanese Patent Application No. 2002-330453 filed on Nov. 14, 2002, entire content of which is expressly incorporated by reference herein.

INDUSTRIAL APPLICABILITY

The present invention can be applied to a case in which communication is performed using CDMA (Code Division Multiple Access) by a transmitting apparatus and receiving apparatus that perform parallel communication of varying data between each multiple reception antennas as in MIMO (Multi Input/Multi Output) communications.

FIG. 1
Transmission signal
Transmission signal
Transmission signal
102-1: spreading section
102-2: spreading section
102-K: spreading section
103-1: spreading section
103-2: spreading section
103-K: spreading section
104-1: adding section
104-2: adding section
105-1: transmitting section
105-2: transmitting section
107: spread control section
Channel quality FIG. 2
Received signal
156: selecting section
154-1: despreading section
154-2: despreading section
154-K: despreading section
155-1: despreading section
155-2: despreading section
155-K: despreading section
153: interference compensating section
152-1: receiving section
152-2: receiving section
157: despread control section
Channel quality FIG. 3
Transmission signal
Transmission signal
Transmission signal
102-1: spreading section
102-2: spreading section
102-M: spreading section
103-1: spreading section
103-2: spreading section
103-N: spreading section
104-1: adding section
104-2: adding section
105-1: transmitting section
105-2: transmitting section
107a: spread control section
Channel quality FIG. 4
Transmission signal
Transmission signal
Transmission signal
102-1: spreading section
102-2: spreading section
1023: spreading section
102-4: spreading section
102-5: spreading section
102-6: spreading section
User 1
User 2
User 3

The invention claimed is:

1. A transmitting apparatus comprising:
a data forming section that forms first data and second data from data addressed to one of a plurality of receiving apparatuses, the receiving apparatuses being different apparatuses from the transmitting apparatus;
a spreading method setting section that sets (a) a first parameter used for spreading the first data and (b) a second parameter used for spreading the second data independently from each other, when (i) the spread first signal, which is generated by performing spectrum spreading on the first data, is to be transmitted from a first antenna to the one receiving apparatus, (ii) the spread second signal, which is generated by performing spectrum spreading on the second data, is to be transmitted from a second antenna to the one receiving apparatus, and (iii) the first antenna and the second antenna are different from each other;
a first spreading section that generates the spread first signal by performing the spectrum spreading on the first data using the first parameter;
a second spreading section that generates the spread second signal by the performing spectrum spreading on the second data using the second parameter;
a first transmitting section that transmits a first code multiplexed signal from the first antenna to the one receiving apparatus, the first code multiplexed signal being generated by multiplexing the spread first signal and another signal; and
a second transmitting section that transmits a second code multiplexed signal from the second antenna to the one receiving apparatus, the second code multiplexed signal being generated by multiplexing the spread second signal and another signal; wherein:
the first parameter is one of: (x) a spreading factor of the spectrum spreading, (y) how many signals are to be multiplexed to generate the first code multiplexed signal, and (z) how many spreading codes are to be assigned to the each of the receiving apparatuses;

the second parameter is one of: (s) a spreading factor of the spectrum spreading, (t) how many signals are to be multiplexed to generate the second code multiplexed signal, and (u) how many spreading codes are to be assigned to each of the receiving apparatuses.

2. The transmitting apparatus according to claim 1, wherein the spreading method setting section sets (a) the first parameter based on a channel quality between the first antenna and the one receiving apparatus, and not based on a channel quality between the second antenna and the one receiving apparatus, and, (b) the second parameter based on a channel quality between the second antenna and the one receiving apparatus, and not based on a channel quality between the first antenna and the one receiving apparatus.

3. The transmitting apparatus according to claim 1, wherein the spreading method setting section sets (a) the first parameter based on a degree of importance of the first data, and not based on a degree of importance of the second data, and, (b) the second parameter based on a degree of importance of the second data, and not based on a degree of importance of the first data.

4. The transmitting apparatus according to claim 1, wherein the spreading method setting section sets (a) the first parameter based on how many times the first data has been retransmitted in a form of the first code multiplexed signal, and not based on how many times the second data has been retransmitted in a form of the second code multiplexed signal, and, (b) the second parameter based on how many times the second data has been retransmitted in a form of the second code multiplexed signal and not based on how many times the first data has been retransmitted in a form of the first code multiplexed signal.

5. The transmitting apparatus according to claim 1, wherein the spreading method setting section sets the spreading factor of spectrum spreading as each of the first parameter and the second parameter and the spreading method setting section sets a spreading factor of the first parameter greater than a spreading factor of the second parameter.

6. The transmitting apparatus according to claim 1, wherein the spreading method setting section sets the number of signals which are to be multiplexed to generate the first code multiplexed signal as the first parameter, the number of signals which are to be multiplexed to generate the second code multiplexed signal as the second parameter, and the number of signals shown by the first parameter is smaller than the number of signals shown by the second parameter.

7. The transmitting apparatus according to claim 1, wherein the spreading method setting section sets the number of spreading codes which are to be assigned to each of the receiving apparatuses as each of the first parameter and the second parameter, and the number of spreading codes shown by the first parameter is greater than the number of spreading codes shown by the second parameter.

8. The transmitting apparatus according to claim 3, wherein the first data comprises control information or retransmission information.

9. The transmitting apparatus according to claim 2, wherein the spreading method setting section performs the setting of the first parameter and the second parameter for only a fixed period of time.

10. The transmitting apparatus according to claim 2, wherein transmission power of the first transmitting section is set greater than transmission power of the second transmitting section.

11. The transmitting apparatus according to claim 7, wherein the spreading method setting section applies the setting of the first parameter and the second parameter to a receiving apparatus having a lower channel quality than a predetermined quality.

12. The transmitting apparatus according to claim 2, wherein the first data comprises a systematic bit when a turbo code is used as an error correction code.

13. The transmitting apparatus according to claim 1, wherein the first code multiplexed signal and the second code multiplexed signal are converted in multicarrier form.

14. A receiving apparatus comprising:

a first receiving section and a second receiving section that receive spacially multiplexed signals spacially multiplexed through first and second receiving antennas, the spacially multiplexed signals being generated by spacially multiplexing a plurality of code multiplexed signals, each of the code multiplexed signals is generated by multiplexing a plurality of spread signals, and each of the plurality of spread signals is generated by performing spectrum spreading on data;

a separating section that generates a first code multiplexed signal and a second code multiplexed signal by separating the spacially multiplexed signals using a channel estimation matrix, the channel estimation matrix including characteristics of each transmission channel where the multiplexed signals pass;

a first despreading section that despreads at least one of the spread signals in the first code multiplexed signal using a first parameter; and a second despreading section that despreads at least one of the spread signals in the second code multiplexed signal using a second parameter; wherein:

the first parameter and the second parameter are set independently from each other;

the first parameter is one of: (x) a spreading factor of the spectrum spreading, (y) how many signals are to be multiplexed to generate the first code multiplexed signal, and (z) how many spreading codes are to be assigned to each receiving apparatus; and the second parameter is one of: (s) a spreading factor of the spectrum spreading, (t) how many signals are to be multiplexed to generate the second code multiplexed signal, and (u) how many spreading codes are to be assigned to each receiving apparatus.

15. The receiving apparatus according to claim 14, wherein (a) the first parameter is set based on a channel quality between the first antenna and the receiving apparatus, and not based on a channel quality between the second antenna and the receiving apparatus, and, (b) the second parameter is set based on a channel quality between the second antenna and the receiving apparatus, and not based on a channel quality between the first antenna and the receiving apparatus.

16. The receiving apparatus according to claim 14, wherein (a) the first parameter is set based on a degree of importance of the data used for generating the first code multiplexed signal, and not based on a degree of importance of the data used for generating the second code multiplexed signal, and, (b) the second parameter is set based on a degree of importance of the data used for generating the second code multiplexed signal, and not based on a degree of importance of the data used for generating the first code multiplexed signal.

17. The receiving apparatus according to claim 14, wherein (a) the first parameter is set based on how many times same data has been retransmitted in a form of the first code multiplexed signal, and not based on how many times same data has been retransmitted in a form of the second code multiplexed signal, and, (b) the second parameter is set based on how many times same data has been retransmitted in a form of the second code multiplexed signal, and not based on how many times same data has been retransmitted in a form of the first code multiplexed signal.

18. A communication terminal apparatus comprising the transmitting apparatus according to claim 1.

19. A base station apparatus comprising the transmitting apparatus according to claim 1.

20. A radio transmitting method comprising:
   a data forming step of forming first data and second data from data addressed to one of a plurality of receiving apparatuses, the receiving apparatuses being different apparatuses from the transmitting apparatus;
   a spreading method setting step of setting (a) a first parameter used for spreading the first data and (b) a second parameter used for spreading the second data independently from each other, when (i) the spread first signal, which is generated by performing spectrum spreading on the first data, is to be transmitted from a first antenna to the one receiving apparatus, (ii) the spread second signal, which is generated by performing spectrum spreading on the second data, is to be transmitted from a second antenna to the one receiving apparatus, and (iii) the first antenna and the second antenna are different from each other;
   a first spreading step of generating the spread first signal by performing the spectrum spreading on the first data using the first parameter;
   a second spreading step of generating the spread second signal by the performing spectrum spreading on the second data using the second parameter;
   a first transmitting step of transmitting a first code multiplexed signal from the first antenna to the one receiving apparatus, the first code multiplexed signal being generated by multiplexing the spread first signal and another signal; and
   a second transmitting step of transmitting a second code multiplexed signal from the second antenna to the one receiving apparatus, the second code multiplexed signal being generated by multiplexing the spread second signal and another signal; wherein,
   the first parameter is one of: (x) a spreading factor of the spectrum spreading, (y) how many signals are to be multiplexed to generate the first code multiplexed signal, and (z) how many spreading codes are to be assigned to each of the receiving apparatuses;
   the second parameter is one of: (s) a spreading factor of the spectrum spreading, (t) how many signals are to be multiplexed to generate the second code multiplexed signal, and (u) how many spreading codes are to be assigned to each of the receiving apparatuses.

21. A radio transmitting system comprising a transmitting apparatus and a plurality of receiving apparatuses, the transmitting apparatus comprising:
   a data forming section that forms first data and second data from data addressed to one of the plurality of receiving apparatuses, the receiving apparatuses being different apparatuses from the transmitting apparatus;
   a spreading method setting section that sets (a) a first parameter used for spreading the first data and (b) a second parameter used for spreading the second data independently from each other, when (i) the spread first signal, which is generated by performing spectrum spreading on the first data, is to be transmitted from a first antenna to the one receiving apparatus, (ii) the spread second signal, which is generated by performing spectrum spreading on the second data, is to be transmitted from a second antenna to the one receiving apparatus, and (iii) the first antenna and the second antenna are different from each other;
   a first spreading section that generates the spread first signal by performing the spectrum spreading on the first data using the first parameter;
   a second spreading section that generates the spread second signal by the performing spectrum spreading on the second data using the second parameter;
   a first transmitting section that transmits a first code multiplexed signal from the second antenna to the one receiving apparatus, the second code multiplexed signal being generated by multiplexing the spread second signal and another signal; and
   a second transmitting section that transmits a second code multiplexed signal from the second antenna to the one receiving apparatus, the second code multiplexed signal being generated by multiplexing the spread second signal and another signal; wherein,
   the first parameter is one of: (x) a spreading factor of the spectrum spreading, (y) how many signals are to be multiplexed to generate the first code multiplexed signal, and (z) how many spreading codes are to be assigned to each of the receiving apparatuses;
   the second parameter is one of: (s) a spreading factor of the spectrum spreading, (t) how many signals are to be multiplexed to generate the second code multiplexed signal, and (u) how many spreading codes are to be assigned to each of the receiving apparatuses.

* * * * *